United States Patent [19]

Filges et al.

[11] Patent Number: 5,082,884
[45] Date of Patent: Jan. 21, 1992

[54] SILICON-CONTAINING POLYMERS COMPOSED MAINLY OF ACRYLATES AND/OR METHACRYLATES

[75] Inventors: Ulrich Filges, Limburgerhof; Oral Aydin, Mannheim; Andreas Otterbach, Frankenthal; Gerhard Auchter, Bad Duerkheim, all of Fed. Rep. of Germany

[73] Assignee: BASF Aktiengesellschaft, Ludwigshafen, Fed. Rep. of Germany

[21] Appl. No.: 482,987

[22] Filed: Feb. 22, 1990

[30] Foreign Application Priority Data

Mar. 11, 1989 [DE] Fed. Rep. of Germany ....... 3907990

[51] Int. Cl.$^5$ ................................................. C08K 3/34
[52] U.S. Cl. .................................... 524/188; 524/555; 523/213
[58] Field of Search ............... 524/188, 555; 523/213; 525/342, 327.4

[56] References Cited

U.S. PATENT DOCUMENTS 4,626,567 12/1986 Chang ................................. 524/188
4,769,409 9/1988 Gay et al. ........................... 524/188

FOREIGN PATENT DOCUMENTS 0043127 1/1982 European Pat. Off. ............ 524/188
199445 10/1986 European Pat. Off. .
1127625 9/1968 United Kingdom .

Primary Examiner—Joseph L. Schofer
Assistant Examiner—Jeffrey T. Smith
Attorney, Agent, or Firm—Oblon, Spivak, McClelland, Maier & Neustadt

[57] ABSTRACT

Silicon-containing polymers consist of
a) from 65 to 99.95 parts by weight of one or more acrylates and/or methacrylates of an aliphatic alcohol of 1 to 12 carbon atoms (monomers A),
b) from 0 to 30 parts by weight of one or more ethylenically unsaturated monomers capable of undergoing free radical copolymerization (monomers B),
c) from 0.05 to 10 parts by weight of one or more anhydrides of an α,β-monoethylenically unsaturated dicarboxylic acid of 4 to 10 carbon atoms (monomers C) or from 0.1 to 10 parts by weight of one or more monomers containing one or more isocyanate groups and capable of undergoing free radical copolymerization (monomers D) and
d) effective amounts of one or more silanes of the general formula I $$NH_2-R^1-Si(R^2)_{3-m}(R^3)_m \qquad (I)$$

where m is 0, 1 or 2, $R^1$ is a hydrocarbon chain of not more than 10 carbon atoms which may be interrupted by oxygen or nitrogen, the radicals $R^2$ are identical or different hydrolyzable groups and the radicals $R^3$ are identical or different $C_1$-$C_5$-alkyl groups.

These silicon-containing polymers are suitable as base polymers for the preparation of sealing compounds curable under the action of atmospheric humidity.

10 Claims, No Drawings

SILICON-CONTAINING POLYMERS COMPOSED MAINLY OF ACRYLATES AND/OR METHACRYLATES

The present invention relates to silicon-containing polymers consisting of
a) from 65 to 99.95 parts by weight of one or more acrylates and/or methacrylates of an aliphatic alcohol of 1 to 12 carbon atoms (monomers A),
(b) from 0 to 30 parts by weight of one or more ethylenically unsaturated monomers capable of undergoing free radical copolymerization (monomers B),
c) from 0.05 to 10 parts by weight of one or more anhydrides of an $\alpha,\beta$-monoethylenically unsaturated dicarboxylic acid of 4 to 10 carbon atoms (monomers C) or from 0.1 to 10 parts by weight of one or more monomers containing one or more isocyanate groups and capable of undergoing free radical copolymerization (monomers D) and
d) effective amounts of one or more silanes of the general formula I $$NH_2-R^1-Si(R^2)_{3-m}(R^3)_m \qquad (I)$$

where m is 0, 1 or 2, $R^1$ is a hydrocarbon chain of not more than 10 carbon atoms which may be interrupted by oxygen or nitrogen, the radicals $R_2$ are identical or different hydrolyzable groups and the radicals $R^3$ are identical or different $C_1-C_5$-alkyl groups.

The present invention furthermore relates to the preparation of the silicon-containing polymers and their use in sealing compounds curable by atmospheric humidity.

EP-A 199 445 discloses silicon-containing polymers which are composed essentially of acrylates and are obtainable by a condensation reaction between polyacrylates as starting polymers and compounds of the general formula I. These silicon-containing polymers essentially composed of acrylates are recommended as a basis for sealing compounds curable under the action of atmospheric humidity. However, the performance characteristics of the said polymers are unsatisfactory since they cure only relatively slowly under the action of atmospheric humidity, in particular at room temperature.

It is an object of the present invention to remedy the disadvantage described by means of more suitable polymers based on acrylates and/or methacrylates.

We have found that this object is achieved by the polymers defined at the outset.

Advantageously polymerized monomers A are esters of acrylic acid or methacrylic acid which are derived from alcohols of 1 to 8 carbon atoms, such as methanol, ethanol, isopropanol, n-butanol, isobutanol, n-pentanol, n-hexanol and 2-ethylhexanol, the esters of acrylic acid being preferred. Particularly preferred acrylates A are ethyl acrylate, n-butyl acrylate, n-hexyl acrylate and 2-ethylhexyl acrylate. From the methacrylate series, methyl methacrylate is of particular interest.

While incorporation of monomers A in the novel polymers is obligatory, the monomers B are merely auxiliary monomers which as a rule are present when the polymers are required to have a certain hardness. Examples of possible monomers B are acrylonitrile, methacrylonitrile, vinyl esters of $C_2-C_{12}$-n-alkanoic acids, such as vinyl acetate and vinyl propionate, and vinylaromatic monomers, such as styrene, vinyltoluene, chlorostyrene or tert-butylstyrene, acrylonitrile, methacrylonitrile and styrene being preferred.

The number of parts by weight of monomers A and B are advantageously chosen with the aid of the Fox relationship in such a way that a polymer consisting only of these monomers would have a glass transition temperature of from $-70°$ to $+15°$ C., preferably from $-50°$ to $-20°$ C. According to Fox (T.G. Fox, Bull. Am. Phys. Soc. [Ser. II] 1 (1956), 123), the following is applicable as a good approximation for the glass transition temperature of copolymers:

$$\frac{1}{Tg} = \frac{X^1}{Tg^1} + \frac{X^2}{Tg^2} + \ldots \frac{X^n}{Tg^n}$$

where $X^1$, $X^2$, $X^n$ are the mass fractions of the monomers 1, 2, ..., n and $Tg^1$, $Tg^2$, ..., $Tg^n$ are the glass transition temperatures, in degrees Kelvin, of the polymers composed of only one of the monomers 1, 2, ... or n. The glass transition temperatures of these homopolymers of the monomers A and B are known and are described in, for example, J. Brandrup and E.H. Immergut, Polymer Handbook 1st Ed., J. Wiley, New York, 1966 and 2nd Ed., J. Wiley, New York, 1975.

Cyclic anhydrides of dibasic acids, such as maleic anhydride, itaconic anhydride and citraconic anhydride, are advantageously used as monomers C, which are preferred to the monomers D, the use of maleic anhydride being particularly advantageous.

Examples of suitable monomers D are $\omega$-isocyanatoalkyl acrylates and methacrylates of the general formula II $$CH_2=\underset{R^4}{\underset{|}{C}}-\overset{O}{\overset{\|}{C}}-O-R^5-N=C=O \qquad II$$

where $R^4$ is hydrogen or methyl and $R^5$ is a hydrocarbon chain of not more than 12 carbon atoms which may be interrupted by one or more oxygen atoms, these being described, inter alia, in DE-A 35 23 692. Other possible monomers D are N-(1-alkenyl) isocyanates where alkenyl is of 2 to 4 carbon atoms, and 1-(4-isopropenylphenyl)-1-methylethyl isocyanate and the adduct of bis-(isocyanato)-carbodiimide and acrylic acid. The two last-mentioned monomers are described, inter alia, in Methoden der organischen Chemie (Houben-Weyl), E20, pages 1573-1575, Georg Thieme Verlag, Stuttgart (1987). Preferred monomers D are vinyl isocyanate, 2-isocyanatoethyl 2-methylacrylate,5-isocyanato-3-oxapentyl2-methylacrylate and 1,2-dimethyl-3-isocyanatopropyl acrylate.

Halogens, the amino group or alkyloxy, alkylthio, alkylamino or dialkylamino groups having a small number of carbon atoms are among the preferred hydrolyzable groups $R^2$. Preferably used silanes I are those in which m is 0, e.g. 3-aminopropyltrimethoxysilane, 3-aminopropyltriethoxysilane and N-(2-aminoethyl-3-aminopropyl)-trimethoxysilane.

The content of silanes I in the novel polymers is dependent on the content of monomers C or D. If the novel polymers contain from 0.05 to 0.5 part by weight of monomers C or D, silanes I are present in amounts such that the quotient Q, formed from the number of moles of incorporated silanes I, as the numerator, and the number of moles of incorporated monomers C or of isocyanate groups incorporated in the form of monomers D, as the denominator, is from 0.75 to 1.0, preferably from 0.85 to 1.0. If the novel polymers contain from 0.5 to 3 (from 3 to 10) parts by weight of the monomers C or D, Q is from 0.01 to 1 (from 0.005 to 1), quotients Q of from 0.1 to 1.0 (from 0.02 to 0.5) being preferred.

The novel polymers are advantageously prepared by a method in which a starting polymer is prepared from the monomers A to D by the conventional process of free radical solution polymerization, and the silanes I are stirred into a solution or melt of the said polymer, usually in the course of a few minutes, the temperature, which is of minor importance, being from 25° to 200° C. As a rule, ethers, such as tetrahydrofuran or dioxane, esters, such as ethyl acetate or n-butyl acetate, ketones, such as acetone or cyclohexanone, N,N-dialkylcarboxamide, such as N,N-dimethylformamide, N,N-dimethylacetamide or N-methyl-2-pyrrolidone, aromatics, such as toluene or xylene, aliphatic hydrocarbons, such as isooctane, chlorohydrocarbons, such as tert-butyl chloride, or plasticizers, such as di-n-butyl phthalate, are used as solvents for the free radical solution polymerization.

Particularly suitable initiators of free radical polymerization are organic azo compounds or organic peroxides, such as azobisisobutyronitrile, dibenzoyl peroxide or tert-butyl perbenzoate.

Chain-transfer substances, such as aliphatic, aromatic or alicyclic mercaptans, e.g. n-butyl mercaptan or n-lauryl mercaptan, or alkyl thioglycolates, such as ethyl thioglycolate, are among the substances which can be added as further assistants. Particularly preferred molecular weight regulators are mercaptoalkoxysilanes. The polymerization temperature is advantageously from 70° to 120° C. The polymerization is usually carried out in the form of a feed process, in which some of the polymerization batch is initially taken and heated to the polymerization temperature and then, while the polymerization temperature is maintained, the remainder of the polymerization batch is fed in continuously in separate feeds, one of which contains the monomers. The feed process generally takes from 2 to 24 h. Finally, polymerization is usually continued for a further 1-2 h. An anhydrous polymerization medium, i.e. one having a water content of less than 100 ppm, is advantageously used. The solution polymerization of the essentially anhydrous reactants is advantageously carried out in the presence of small amounts of drying agents, such as tetraalkoxysilanes, e.g. tetramethoxysilane, or trialkyl orthoformates, eg. triethyl orthoformate, with or without the addition of a Lewis acid. If required, the solvent can be separated off partially or completely from the resulting solutions of the starting polymers, for example by distillation under reduced pressure. The K value of the resulting starting polymers in tetrahydrofuran (THF) is preferably from 8 to 100, particularly preferably from 15 to 60. The K value is a relative viscosity number which is determined similarly to DIN 53,726 at 25° C. It is the flow velocity of a mixture of 0.01 g of polymer per mole of THF relative to the flow velocity of pure THF and characterizes the mean degree of polymerization of the polymer.

The novel polymers are obtainable in the presence or absence of a solvent by stirring the silanes I into melts or solutions of the starting polymers, the reaction generally taking place within a few minutes even at room temperature. The novel polymers are relatively rapidly curable by the action of atmospheric humidity at room temperature and are thus suitable, in the presence or absence of a solvent, for the preparation of sealing compounds curable by atmospheric humidity. Assistants which may be added include external plasticizers, inert fillers, thickeners, dyes, solvents, agents for increasing the aging resistance or active ingredients which accelerate curing by the action of atmospheric humidity. The amounts of additives are familiar to the skilled worker and are selected in accordance with the desired properties of the particular compound and advantageously stirred into the solutions or melts of the novel polymers. The amount of novel silicon-containing polymers is as a rule from 30 to 100, preferably from 50 to 100, % by weight, while the amount of inert fillers is from 0 to 50% by weight, the percentages being based on the total weight of the formulation.

Suitable external plasticizers are, for example, phthalates, such as diethyl phthalate, di-n-butyl phthalate, diisoheptyl phthalate or di-(2-ethylhexyl) phthalate, adipates, such as di-2-ethylhexyl adipate or diisooctyl adipate, sebacates, such as di-(2-ethylhexyl)-sebacate, phosphates, such as tri-n-butyl phosphate, triisobutyl phosphate or tri-($\beta$-chloroethyl) phosphate, and chlorohydrocarbons.

Particularly suitable inert fillers are aluminum silicates, quartz, precipitated or pyrogenic silica, which may be rendered hydrophobic, gypsum, barite, talc, dolomite, calcium carbonate and color-imparting pigments, such as titanium white, lead white, chrome yellow, red lead, zinc yellow or carbon black.

The novel polymers are characterized by curing which takes place rapidly, even at room temperature, under the action of atmospheric humidity and can be accelerated, if required, by adding appropriate active ingredients, such as tetra-n-butyl titanate, di-n-butyltin di-n-dodecanoate or di-n-butyltin diacetate.

The sealing compounds can be prepared in the form of a single-component system in which all components are mixed, and then stored in a sealed container. However, it can also be used in the form of a two-component system in which the starting polymer and the assistants are mixed to form one component, into which the silanes I are stirred as the second component before use. In the case of a single-component system, particular care must be taken to exclude water since otherwise premature curing of the sealing compound occurs. In the case of a two-component system, the presence of small traces of water in the starting polymer or in the assistants is less critical, facilitating both processing of the starting components and storage of the sealing compound.

EXAMPLES B1 TO B14 AND COMPARATIVE EXAMPLE V

Various silicon-containing polymers which are composed mainly of acrylates and/or methacrylates

B1

A solution of 300 g of toluene, 1 g of triethyl orthoformate and 50 g (510 mmol) of maleic anhydride was heated to the polymerization temperature of 110° C., after which 550 g of n-butyl acrylate and at the same time, in the course of 3.5 h, a solution of 2 g of azobisisobutyronitrile in 100 g of toluene were added in the course of 2.5 h while the polymerization temperature was maintained. Thereafter, polymerization was continued for a further 2 h at 110° C. The K value (in THF) of the starting polymer obtained in solution was 32. 12 g (67 mmol) of 3-aminopropyltrimethoxysilane was stirred into the resulting solution of the starting polymer at room temperature in the course of 5 min. A sample of the liquid obtained was applied as a 2 mm thick layer to a glass sheet and exposed to standard conditions of temperature and humidity (23° C., 50% relative humidity). After 24 h, the film formed no longer exhibited any flow.

B2

As for B1, except that 12 g (60 mmol) of 5-isocyanato-3-oxapentyl 2-methylacrylate were polymerized instead of the 50 g of maleic anhydride. The K value (in THF) of the starting polymers was 36.5. After 70 h, the film formed no longer exhibited any flow.

V

A solution of 300 g of toluene and 1 g of triethyl orthoformate was heated to the polymerization temperature of 110° C. and then, while the polymerization temperature was maintained, 600 g of n-butyl acrylate were added in the course of 2.5 h and, at the same time, a solution of 2 g of azobisisobutyronitrile in 100 g of toluene was added in the course of 3.5 h. Polymerization was then continued for a further 24 h at 110° C. The K value (in THF) of the starting polymer obtained in solution was 33.2. The resulting solution of the starting polymer was heated with 12 g of 3-aminopropyltrimethoxysilane for 4 h at 140° C. A sample of the resulting liquid was then applied to a glass sheet as a 2 mm thick layer and exposed to standard conditions of temperature and humidity. Even after 96 h, the film formed still exhibited flow.

B3

A solution of 300 g of toluene and 2 g of triethyl orthoformate was heated to the polymerization temperature of 80° C. and then a monomer mixture of 500 g of n-butyl acrylate, 90 g of acrylonitrile and 10 g (65 mmol) of 2-isocyanatoethyl 2-methylacrylate was added in the course of 3 h and, at the same time, a solution of 2 g of azobisisobutyronitrile in 100 g of toluene was added in the course of 3.5 h. Polymerization was then continued for a further 1.5 h at 110° C. and 150 g of solvent were then distilled off under reduced pressure. Thereafter, 11.6 g (65 mmol) of 3-aminopropyltrimethoxysilane were stirred into the solution containing a starting polymer having a K value (in THF) of 42.0, at room temperature, and a sample of the resulting formulation was applied to a glass sheet as a 2 mm thick layer and exposed to standard conditions of temperature and humidity for 3 weeks. A transparent flexible film having a tensile strength of 0.37 N/mm$^2$ and an elongation at break (both determined according to DIN 53,504 at a transport velocity of 100 mm/min and with the use of test specimen S3A) of 677% was obtained.

B4

As for B3, but with the following differences: the polymerization temperature was 80° C., the monomer mixture was composed of 540 g of ethyl acrylate, 50 g of acrylonitrile and 10 g (65 mmol) of 2-isocyanatoethyl 2-methylacrylate, the monomer mixture was fed in over 1 h 45 min, the initiator solution contained 3 g of azobisisobutyronitrile and was fed in simultaneously with the monomer mixture in the course of 2 h 30 min, polymerization was completed at 90° C., the amount of solvent distilled off was 100 g, the K value of the starting polymer (in THF) was 45.9 g, 14.3 g (65 mmol) of 3-aminopropyltriethoxysilane were added as silane I, the tensile strength was 1.3 N/mm$^2$ and the elongation at break was 146%.

B5

As for B3, but with the following differences: the polymerization temperature was 105° C., the monomer mixture was composed of 490 g of ethyl acrylate, 100 g of n-butyl methacrylate and 12 g (77 mmol) of 2-isocyanatoethyl 2-methylacrylate, the monomer mixture was fed in over 2 h, the initiator solution contained 3 g of azobisisobutyronitrile and was fed in simultaneously with the monomer mixture in the course of 2 h 15 min, polymerization was completed in the course of 2 h, the amount of solvent distilled off was 100 g, the K value of the starting polymer (in THF) was 36.4 g, 14.3 g (64 mmol) of N-(2-aminoethyl-3-aminopropyl)-trimethoxysilane were added as silane I, the tensile strength was 0.36 N/mm$^2$ and the elongation at break was 345%.

B6

As for B3, but with the following differences: the polymerization temperature was 100° C., the monomer mixture was composed of 500 g of n-butyl acrylate, 90 g of ethyl acrylate and 15 g (75 mmol) of 5-isocyanato-3-oxapentyl 2-methylacrylate, the monomer mixture additionally contained 2 g of ethyl thioglycolate, the monomer mixture was fed in over 2.5 h, the initiator solution contained 4 g of azobisisobutyronitrile and was fed in simultaneously with the monomer mixture in the course of 3 h, polymerization was completed in the course of 1 h, the solvent was completely distilled off, the K value of the starting polymer (in THF) was 21.4, the amount of 3-aminopropyltrimethoxysilane added was 12 g (67 mmol), the said silane being added together with 2 g of di-n-butyltin di-n-dodecanoate, the tensile strength was 0.2 N/mm$^2$ and the elongation at break was 98%.

B7

As for B3, but with the following differences: the polymerization temperature was 100° C., the monomer mixture was composed of 590 g of ethyl acrylate and 10 g (50 mmol) of 5-isocyanato-3-oxapentyl 2-methylacrylate, the monomer mixture was fed in over 2 h, the initiator solution contained 4 g of azobisisobutyronitrile and was fed in simultaneously with the monomer mixture in the course of 2 h 30 min, polymerization was completed in the course of 1 h, the amount of solvent distilled off was 200 g, the K value of the starting polymer (in THF) was 26.1, the amount of 3-aminopropyltrimethoxysilane added was 9 g (50 mmol), the said silane being added together with 30 g of pyrogenic silica which had been rendered hydrophobic and 2 g of di-n-butyltin di-n-dodecanoate, the tensile strength was 0.8 N/mm$^2$ and the elongation at break was 110%.

B8

As for B3, but with the following differences: the polymerization temperature was 100° C., the monomer mixture was composed of 490 g of ethyl acrylate, 100 g of acrylonitrile and 10 g (50 mmol) of 5-isocyanato-3-oxapentyl 2-methylacrylate, the monomer mixture was fed in over 2 h, the initiator solution contained 4 g of azobisisobutyronitrile and was fed in simultaneously with the monomer mixture in the course of 2 h 30 min, polymerization was completed in the course of 1 h, the amount of solvent distilled off was 100 g, the K value of the starting polymer (in THF) was 39.5, the amount of 3-aminopropyltrimethoxysilane added was 9 g (50 mmol), the tensile strength was 2.3 N/mm$^2$ and the elongation at break was 550%.

B9

As for B3, but with the following differences: the polymerization temperature was 110° C., the initially taken solution additionally contained 10 g (102 mmol) of maleic anhydride, the monomer mixture was composed of 510 g of ethyl acrylate, 60 g of methyl methacrylate and 20 g of styrene, polymerization was completed at 130° C. in the course of 1 h, the amount of solvent distilled off was 80 g, the K value of the starting polymer (in THF) was 37.5, the amount of 3-aminopropyltrimethoxysilane added was 18.3 g (102 mmol), the tensile strength was 1.08 N/mm² and the elongation at break was 575%.

B10

As for B3, but with the following differences: the polymerization temperature was 110° C., the initially taken solution additionally contained 10 g (102 mmol) of maleic anhydride, the monomer mixture was composed of 410 g of ethyl acrylate, 160 g of methyl methacrylate and 20 g of styrene, polymerization was completed at 130° C. in the course of 1 h, no solvent was distilled off, the K value of the starting polymer (in THF) was 34, the amount of 3-aminopropyltrimethoxysilane added was 10 g (56 mmol), the tensile strength was 1.52 N/mm² and the elongation at break was 358%.

B11

As for B3, but with the following differences: the polymerization temperature was 100° C., the initially taken solution additionally contained 20 g (204 mmol) of maleic anhydride, the monomer mixture was composed of 510 g of n-butyl acrylate, 60 g of acrylonitrile and 20 g of styrene, the monomer mixture additionally contained 2 g of ethyl thioglycolate, the initiator solution was fed in simultaneously with the monomer mixture in the course of 3 h, polymerization was completed at 100° C. in the course of 1 h, the amount of solvent distilled off was 400 g, the K value of the starting polymer (in THF) was 30.5, the amount of 3-aminopropyltrimethoxysilane added was 10 g (56 mmol), the tensile strength was 1.32 N/mm² and the elongation at break was 363%.

B12

As for B3, but with the following differences: the polymerization temperature was 100° C., the initially taken solution additionally contained 10 g (102 mmol) of maleic anhydride, the monomer mixture consisted only of 590 g of ethyl acrylate and was fed in over 2 h, the initiator solution was fed in simultaneously with the monomer mixture in the course of 2.5 h, polymerization was completed in the course of 1 h, the amount of solvent distilled off was 120 g, the K value of the starting polymer (in THF) was 28.4, 10 g (45 mmol) of 3-aminopropyltriethoxysilane were added as silane I, the tensile strength was 0.36 N/mm² and the elongation at break was 347%.

B13

As for B3, but with the following differences: the polymerization temperature was 90° C., the initially taken solution additionally contained 30 g (306 mmol) of maleic anhydride, the monomer mixture was composed of 510 g of n-butyl acrylate, 60 g of acrylonitrile and 20 g of styrene, the monomer mixture was fed in over 2.5 h, the initiator solution contained 4 g of azobisisobutyronitrile and was fed in simultaneously with the monomer mixture in the course of 3 h, polymerization was completed in the course of 1 h, no solvent was distilled off, the K value of the starting polymers (in THF) was 36.1, 12 g (54 mmol) of 3-aminopropyltriethoxysilane were added as silane I, together with 50 g of pyrogenic silica which had been rendered hydrophobic and 1 g of di-n-butyltin di-n-dodecanoate, the tensile strength was 1.1 N/mm² and the elongation at break was 230%.

B14

As for B3, but with the following differences: the polymerization temperature was 120° C., the initially taken solution consisted of 370 g of di-n-butyl phthalate, 5 g of tetraethoxysilane and 20 g (204 mmol) of maleic anhydride, the monomer mixture was composed of 710 g of ethyl acrylate and 180 g of methyl methacrylate and was fed in over 2.5 h, the initiator solution consisted of 5 g of tert-butyl perbenzoate and 30 g of di-n-butyl phthalate and was fed in simultaneously with the monomer mixture in the course of 3.0 h, polymerization was completed at 120° C. in the course of 1 h, no solvent was distilled off, the K value of the starting polymer (in THF) was 39, 14 g (63 mmol) of 3-aminopropyltriethoxysilane were added as silane I, the tensile strength was 0.1 N/mm² and the elongation at break was 83%.

We claim:

1. A silicon-containing polymer consisting of
   (a) from 65 to 99.95 parts by weight of a member selected from the group consisting of acrylates, methacrylates and mixtures thereof of an aliphatic alcohol of 1 to 12 carbon atoms (monomers A),
   (b) from 0 to 30 parts by weight of one or more ethylenically unsaturated monomers capable of undergoing free radical copolymerization (monomers B),
   (c) from 0.05 to 10 parts by weight of one or more anhydrides of an α,β-monoethylenically unsaturated dicarboxylic acid of 4 to 10 carbon atoms (monomers C) or from 0.1 to 10 parts by weight of one or more monomers containing one or more isocyanate groups and capable of undergoing free radical copolymerization (monomers D) and
   (d) effective amounts of one or more silanes of the general formula I $$NH_2-R^1-Si(R^2)_{3-m}(R^3)_m \qquad (I)$$

where m is 0, 1 or 2, $R^1$ is a hydrocarbon chain of not more than 10 carbon atoms which may be interrupted by oxygen or nitrogen, the radicals $R^2$ are identical or different hydrolyzable groups and the radicals $R^3$ are identical or different $C_1$–$C_5$-alkyl groups.

2. A silicon-containing polymer as claimed in claim 1 comprising such amounts of one or more of the said silanes I that the quotient Q, formed from the number of moles of incorporated silanes I, as the numerator, and the number of moles of incorporated monomers C or of isocyanate groups incorporated in the form of monomers D, as the denominator, is from 0.75 to 1.0, if the polymer contains from 0.05 to 0.5 part by weight of one or more of the monomers C or 0.1 to 0.5 part by weight of one or more of the monomers D, said Q is from 0.01 to 1.0, if the polymer contains from 0.5 to 3 parts by weight of one or more of the monomers C or D, and said Q is from 0.005 to 1.0, if the polymer contains from 3 to 10 parts by weight of one or more of the monomers C or D.

3. A silicon-containing polymer as claimed in claim 1 comprising from 0.05 to 10 parts by weight of one or more of the said monomers C.

4. A silicon-containing polymer as claimed in claim 2 comprising from 0.05 to 10 parts by weight of one or more of the said monomers C.

5. A silicon-containing polymer as claimed in claim 2 comprising from 0.05 to 0.5 part by weight of one or more of the said monomers C or from 0.1 to 0.5 part by weight of one or more of the said monomers D.

6. A silicon-containing polymer as claimed in claim 5 comprising from 0.05 to 0.5 part by weight of the said monomers C.

7. A silicon-containing polymer as claimed in claim 2 comprising from 0.5 to 3 parts by weight of the said monomers C or D.

8. A silicon-containing polymer as claimed in claim 7 comprising from 0.5 to 3 parts by weight of the said monomers C.

9. A silicon-containing polymer as claimed in claim 2 comprising from 3 to 10 parts by weight of the said monomers C or D.

10. A silicon-containing polymer as claimed in claim 9 comprising from 3 to 10 parts by weight of the said monomers C.

* * * * *